March 11, 1952     T. CARLSON     2,588,962
FLASHLIGHT AND HEARING AID BATTERY BOOSTER Filed Oct. 14, 1949     2 SHEETS—SHEET 1

Trygve Carlson
INVENTOR.

BY

March 11, 1952  T. CARLSON  2,588,962
FLASHLIGHT AND HEARING AID BATTERY BOOSTER
Filed Oct. 14, 1949  2 SHEETS—SHEET 2

Trygve Carlson
INVENTOR.

BY *Clarence A. O'Brien*
*and Harvey B. Jacobson*
Attorneys

Patented Mar. 11, 1952

2,588,962

UNITED STATES PATENT OFFICE 2,588,962

FLASHLIGHT AND HEARING AID BATTERY BOOSTER

Trygve Carlson, Kodiak, Territory of Alaska

Application October 14, 1949, Serial No. 121,395

1 Claim. (Cl. 136—164)

This invention relates to novel and useful improvements in battery chargers.

An object of this invention is to recharge a battery, the battery being of the type normally employed in flash-lights, hearing aid sets and other items by introducing a charge of current properly to the battery or batteries after the current has passed through a resistor which may be in the form of an electric lamp or resistor employed in automotive vehicles.

Another object of this invention is to hold the batteries by the improved structure which maintains them adjacent and contacting each other but which holds them in a releasable fashion, it being easy to insert and remove the batteries prior to and after charging.

Other objects and features will become apparent in following the illustrated form of the invention.

Figure 1:
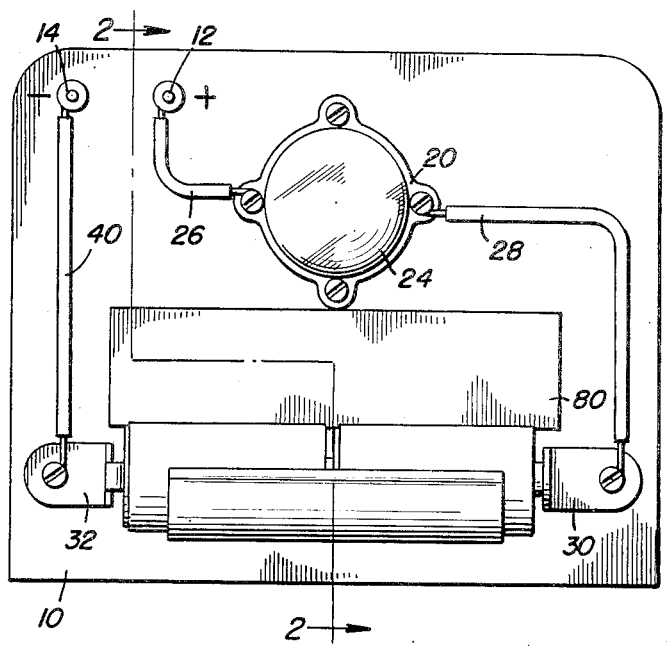
Figure 1 is an elevational view of one form of the invention.
Figure 3:
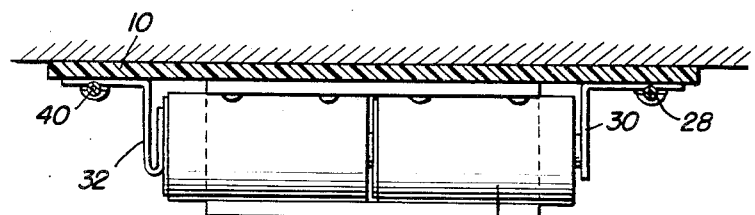
Figure 3 is a sectional view taken substantially on the line 3—3 of Figure 2 and in the direction of the arrows.
Figure 2:
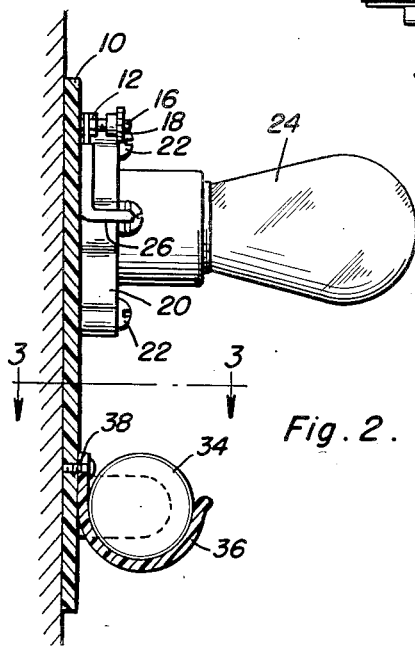
Figure 2 is a sectional view taken substantially on the line 2—2 of Figure 1 and in the direction of the arrows.

The illustrated embodiments of the invention teach the use of the invention in two environments. The embodiment of Figures 1-3 is to be employed wherever line current is available. A base 10, preferably of insulative material, is provided with a pair of line terminals 12 and 14 respectively. Each terminal consists of a threaded member fixed to the base with a threaded screw or shank 16 extending therefrom and a nut 18 disposed on the shank.

A standard socket 20 is secured as by the screws 22, to the base 10 releasably holding the lamp 24 therein.

This lamp acts as a resistor for the system. Any size lamp may be employed, in accordance with the value of the line current.

An electrical conductor 26 extends from the terminal 12 to the socket 20. Then, the conductor continues as at 28, from the socket 20 to a clip 30.

The clip 30 is one of a pair, the other being indicated at 32. Both clips are resilient in nature and are adapted to support one or more batteries 34. The batteries are laid end-to-end, as disclosed in Figure 3 and rest in the cradle 36. The cradle 36 is preferably of electrically insulating material and is substantially semicircular in cross section, it being held to the base 10 by means of screws 38, molding or the like. The terminal 14 has a conductor 40 extending therefrom which terminates in electrical communication with the clip 32 so that a circuit through the device is completed.

Figure 4:
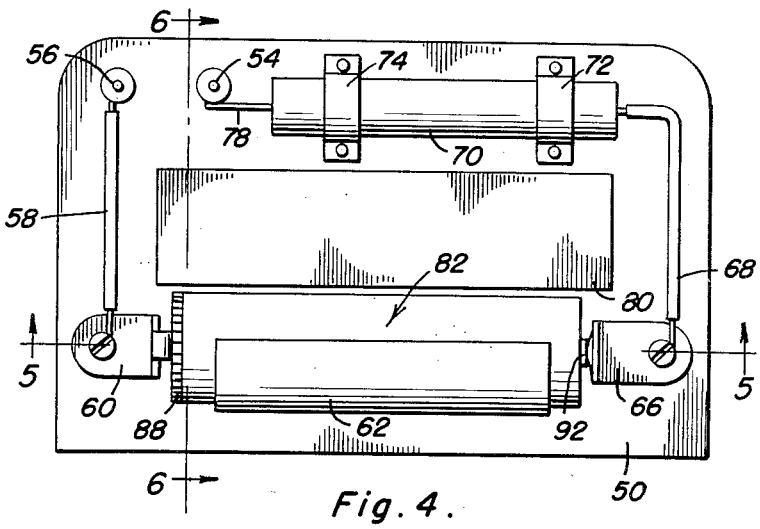
Figure 4 is an elevational view of a modification of the invention.
Figure 5:
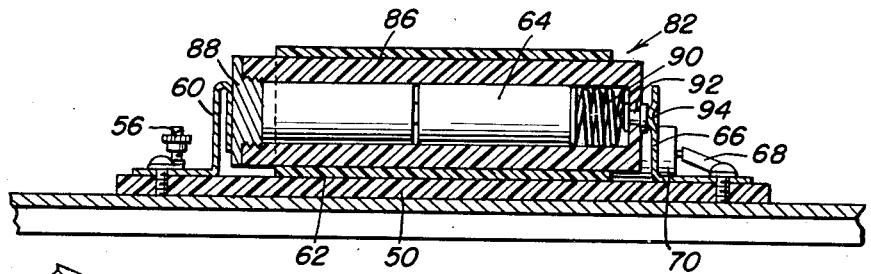
Figure 5 is a sectional view taken substantially on the line 5—5 of Figure 4 and in the direction of the arrows; and, Figure 6 is a sectional view taken on the line 6—6 of Figure 4.
Figure 6:
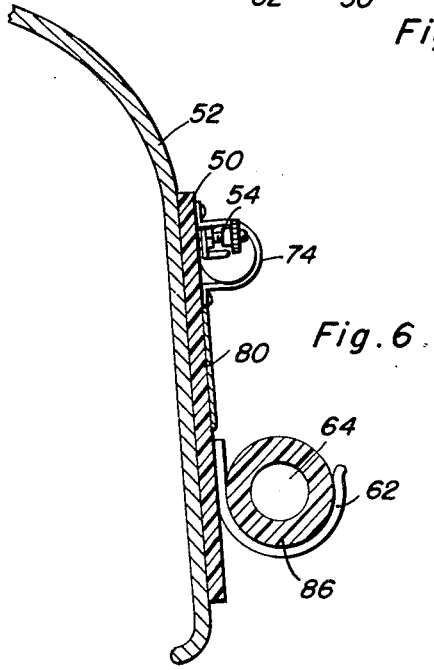

Reference is now made to the embodiment of the invention shown in Figures 4-6. The base 50 is very similar to the base 10 and serves in a similar capacity. However, it is suggested that this embodiment of the invention be used in an automotive vehicle, a part 52 of which is illustrated in Figure 6.

The terminals 54 and 56 are secured in the base 50 and are adapted to be connected with the line current of the vehicle. The conductor 58 extends from its terminal 56 and is secured to the clip 60 which is identical to the clip 32. The cradle 62 is secured to the base 50 in order to support the batteries 64.

The clip 66 forms one of the pair including said clip 66 and the clip 60. A conductor 68 extends from the clip 60 and is secured to the resistor 70 of the extremely common type employed in radios and in many other places in the electrical system of an automobile. The resistor 70 is removably held in place by means of the brackets 72 and 74 which are secured to the base 50. The resistors simply slide thereunder. The conductor 68 continues as at 78 from the opposite end of the resistor 70 and is secured to the terminal 54.

An instruction panel 80 is disposed between the cradle 62 and the resistor 70. Similarly, in the first described modification of the invention, the instruction panel 80 is fixed to the base 10.

A holder generally indicated at 82 is disposed in the cradle and is in electrical contact with the pair of clips 60 and 66. This holder is for the batteries 64 and consists of an electrically insulating tube 86 having a removable closure 88 at one open end thereof and threaded in place. The closure contacts the clip 60.

A spring 90 is disposed in the other end of the tube 86 and is adapted to engage one of the terminals of one of the batteries 64, while the other end of the spring is secured to the contact 92. This contact passes through the end of the tube 86 and is engaged by a detent 95 provided in the clip 66.

In operation it is only necessary to appropriately place the batteries in place in the holders of either embodiment of the invention and cause current to flow through either of the described circuits. The device may operate on any voltage found accessible, as from a 6 volt gas boat power plant, 32 volt farm plant or 110 volt power plant in a house, camp or ship at sea.

Having described the invention, what is claimed as new is:

A battery charging device comprising a base with a first and a second line terminal, a pair of resilient clips secured to said base in spaced relation to support at least one battery, an electrical conductor secured to one of said clips and said first terminal, an electrical conductor with a resistor interposed therein connecting the other of said clips and said second terminal, detachable means for releasably supporting at least one battery disposed and held between said clips, including a tube of insulating material with an electrically conductive closure at one end, a spring disposed in said tube at the opposite end of said tube, a contact carried by said tube and engaging said spring, a cradle to support said tube, said cradle being substantially U-shaped in cross-section with side portions, one of said side portions being secured to said base and said cradle opening upwardly so that said tube may be lifted from said cradle.

TRYGVE CARLSON.

REFERENCES CITED

The following references are of record in the file of this patent:

UNITED STATES PATENTS

| Number | Name | Date |
| --- | --- | --- |
| 1,457,671 | Rector | June 5, 1923 |
| 1,471,739 | Kammerhoff | Oct. 23, 1923 |
| 2,036,547 | Siemon | Apr. 7, 1936 |
| 2,199,322 | Skinner | Apr. 30, 1940 |
| 2,410,527 | Schinske | Nov. 5, 1946 |
| 2,418,141 | Salazar | Apr. 1, 1947 |
| 2,431,116 | Grover | Nov. 18, 1947 |

FOREIGN PATENTS

| Number | Country | Date |
| --- | --- | --- |
| 881,403 | France | Apr. 23, 1943 |

OTHER REFERENCES

Popular Science, May 1945, page 194.
Popular Science, Sept. 1948, page 229.